United States Patent [19]

Carrell

[11] Patent Number: 4,871,903

[45] Date of Patent: Oct. 3, 1989

[54] APPARATUS FOR RAPIDLY ACCESSING A LARGE DATA BASE EMPLOYING AN OPTICAL DISC READING SYSTEM WITH MULTIPLE HEADS AND TRACK POSITION COMPENSATION MEANS

[75] Inventor: Ross M. Carrell, Cinnaminson, N.J.

[73] Assignee: General Electric Company, Schenectady, N.Y.

[21] Appl. No.: 80,123

[22] Filed: Jul. 31, 1987

[51] Int. Cl.[4] .................... G06F 15/40; G11B 27/19
[52] U.S. Cl. .................... 235/375; 235/432; 369/32; 369/34; 369/44; 369/54; 369/58; 360/78.14; 360/72.2
[58] Field of Search .............. 360/98, 86, 78, 75, 360/63, 64, 72.2, 49, 78.01, 78.04, 78.11, 78.14; 235/375, 376, 419, 432, 385, 383, 454; 365/234; 369/30, 32, 33, 34, 35, 40, 44, 41, 69, 112, 178, 197, 198, 59, 54, 58; 364/464, 466, 478

[56] References Cited

U.S. PATENT DOCUMENTS

| | | | |
|---|---|---|---|
| 3,774,172 | 11/1973 | Silverman | 360/98 |
| 4,270,154 | 5/1981 | Crawford | 360/98 |
| 4,414,590 | 11/1983 | Merdian, Jr. et al. | 360/98 |
| 4,423,448 | 12/1983 | Frandsen | 360/98 |
| 4,481,412 | 11/1984 | Fields | 235/419 |
| 4,529,871 | 7/1985 | Davidson | 235/385 |
| 4,532,621 | 7/1985 | Nakagawa | 369/59 |
| 4,578,759 | 3/1986 | Horil | 364/478 |
| 4,641,753 | 2/1987 | Tamada | 364/478 |
| 4,644,515 | 2/1987 | Allebest et al. | 369/32 |
| 4,646,278 | 2/1987 | Okano | 369/32 |
| 4,725,718 | 2/1988 | Sansone et al. | 235/375 |
| 4,745,587 | 5/1988 | Maeda et al. | 369/32 |

OTHER PUBLICATIONS

J. P. Roth ed. "Essential Guide to CD-ROM", Meckler Publishing, 1986 pp. vii–viii, 1–2, 4–11, 17–19, 21–23, 38, 39, 42–46 and 50–51.

Primary Examiner—Alan Faber
Assistant Examiner—Robert A. Weinhardt
Attorney, Agent, or Firm—William Squire; James C. Davis, Jr.; Paul R. Webb, II

[57] ABSTRACT

An OCR reads the name and address on sequentially conveyed mail. An index number is derived for each name and address for correlating that name and address to r-$\theta$ coordinates of file tracks on a CD-ROM disc which is rotated at constant velocity. The index number is derived from the read address to identify the CD-ROM disc containing the desired data and the track containing a nine or eleven-digit zip code for that read address. Four read heads on each of multiple CD-ROM players are used to access the data based on head availability. The read head controllers have updated r-$\theta$ and clocking data for accurately locating a track regardless disc manufacturing and thermal variations and for reading data from any track at substantially the same data rate. A bar code containing a nine or eleven digit zip code, as applicable, is printed on the read letter for later automatic sorting by zip code.

18 Claims, 3 Drawing Sheets

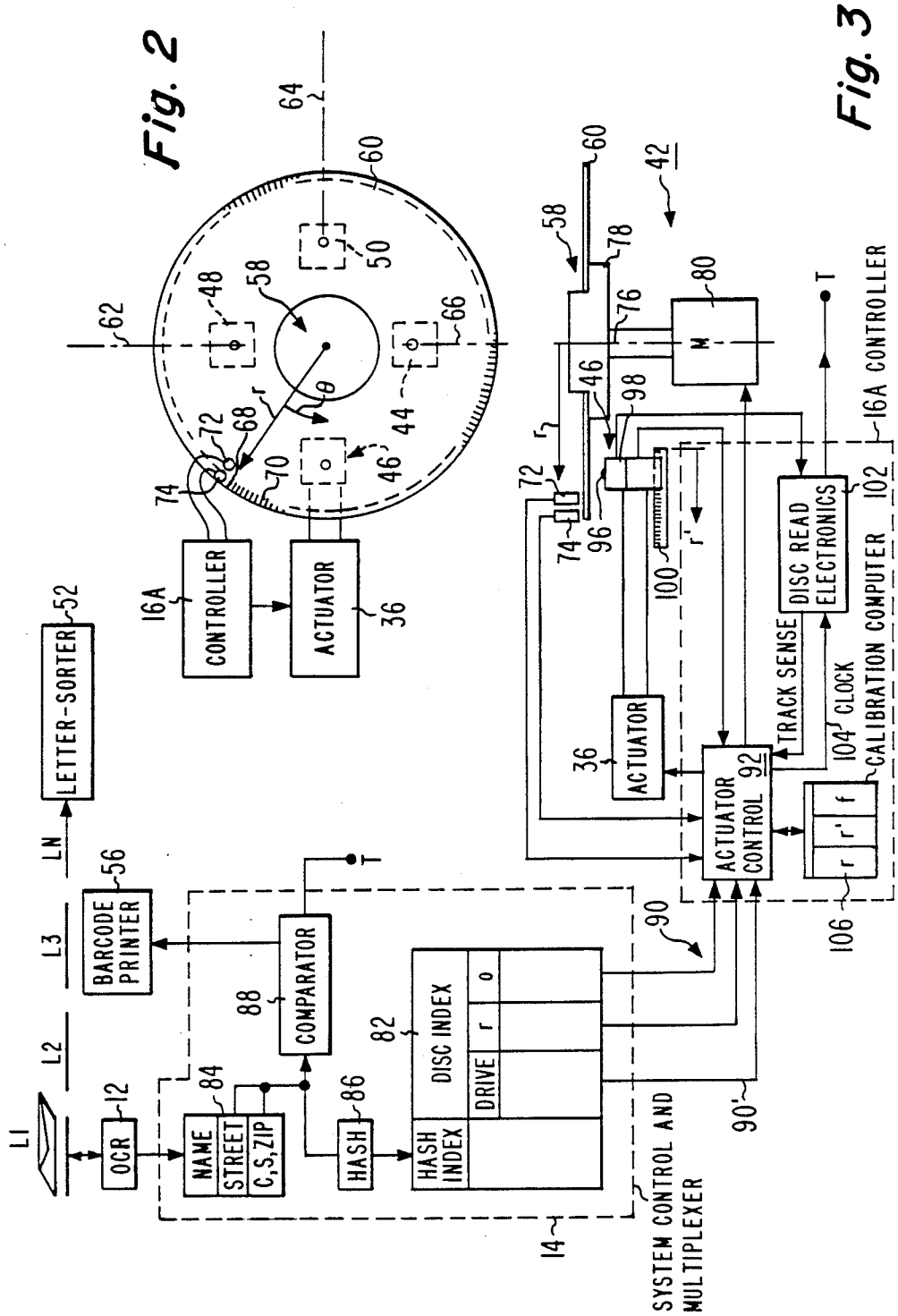

APPARATUS FOR RAPIDLY ACCESSING A LARGE DATA BASE EMPLOYING AN OPTICAL DISC READING SYSTEM WITH MULTIPLE HEADS AND TRACK POSITION COMPENSATION MEANS

This invention relates to an apparatus for accessing a relatively large data base in one seek.

The United States Postal Service (USPS) presently intends to provide several hundred letter sorting machines at spaced locations around the United States equipped with optical character reading (OCR) systems which will be able to read the entire address block for a given addressee. The purpose of this is to permit the USPS to print nine or eleven digit zip codes on pieces of mail which will in turn enable advance sorting strategies to thereby affect significant reductions in postal operation costs.

The USPS employs two types of automatic sorting equipment. In this first type, the characters of the address block are read by optical character reader (OCR) systems. In existing sorters, the bottom line containing the cite, state and zip code is read. From this data a barcode is marked on the envelope by an ink jet printer. This barcode can be read by automatic sorters of the second type, which are less expensive since they are not equipped with the OCR system. The USPS system contains many more sorters of the second type than of the first type.

Each such letter sorter requires a data base which contains the destination addresses corresponding to the nine digit (zip+4) or eleven digit (zip+6) zip codes. The nine digit zip code defines the ranges of addresses, such as a side of a street, or a floor of an office building. The USPS maintains a file of standard address ranges for the zip+4 codes, which consists of about 29 million records requiring approximately 3 gigabytes for storage. A standard address is that assigned by the USPS. Individual postal patrons may inscribe mailpieces with variations on or additions to the standard address. These variations are a problem in the design of OCR systems for USPS. The present inventor recognises a need to provide rapid access to the file of standard addresses.

The eleven digit zip code defines all the specific mail destinations in the country, and consists of some 86 million records. An additional factor is that there are approximately 40 million changes of addresses each year; the change of address file is kept for eighteen months. Thus, there are an average of about 110 thousand changes of address per day. The data base to retain these addresses for eighteen months contains 60 million records.

It is required by the USPS that the letter sorters process twelve letters per second (80 millisec per letter). Further, the data base containing all of the addresses must be accessed at this rate on a continued sustained basis. It is intended that there be 650 letter sorters on a nation wide basis. Such sorters will be located at 250 sectional centers. Letters entering the center are to be marked with a bar code containing the nine or eleven zip digits; thereafter, simple sorters will read the code. Each of the 650 data bases is a duplicate containing the addresses for the entire country.

Conventional data base technology is believed unable to provide the required performance at a reasonable cost. Magnetic disc recording systems of requisite capacity are standard features of large computer systems. These are controlled by data base software which enable continuous incremental updates of the records by many users. The consequence of this procedure is that the distribution of data on a disc becomes progressively more complex and multiple seeks are necessary to find specific items. Thus, even though the access time for a high performance disc may be as low as 18 milliseconds (ms), so many accesses are required that the 80 ms (12 per second) goal cannot be met.

The present inventor recognizes that the bulk of such a data base is static. Such a data base can be updated periodically at a central site and copies distributed to local cites where it can be read but not revised. Such data bases can be updated, published and distributed as wholes and local updating may be by complete replacement of the entire data base. Because any specific issue of the data base is static, it can be organized in a simple manner such that one seek to a track and scan of that track will find any record.

The most useful means of current data base distribution are CD-ROM (compact disc read only memory) and digital video tape (D-1 format). CD-ROM refers to the use of compact audio disc technology for the distribution and reproduction of digital data. A single such disc contains in excess of 0.5 gigabytes (GB) of user data, after system overhead and error correction are included. Digital video tape refers to the use of helical scan video recording technology to record digital signals. The recording density is significantly greater than on conventional computer tapes.

CD-ROM's are conventionally recorded with a spiral tape at constant linear velocity. The recorded data rate is constant and the disc speed must change with the radial position of the recording or read head. The read head contains a semiconductor laser and sensors which provide signals for focus and tracking servos, as well as data readout. Commercial CD-ROM players are intended for personal computers and feature access times of the order of one second, which is impractical for the USPS applications.

According to the present invention a CD-ROM disc read system for reading data recorded at a constant linear rate on a disc track comprises a CD-ROM disc drive means for driving a received disc at a constant angular velocity. This results in different playback data rates for different radius portions of the track. A plurality of read head means are coupled to the drive means for independently accessing and reading data at a plurality of disc locations from anywhere on a given disc at substantially the same constant data rate regardless the difference in actual data rates occurring on the different track portions being read. Control means select and operate the selected read head means.

In the Drawing:

FIG. 2 is a plan view partially diagrammatic of one disc drive system according to the embodiment of FIG. 1;

FIG. 3 is a block diagram of one actuator controller system used to read data from a given disc according to the embodiment of FIG. 1.

Figure 1:
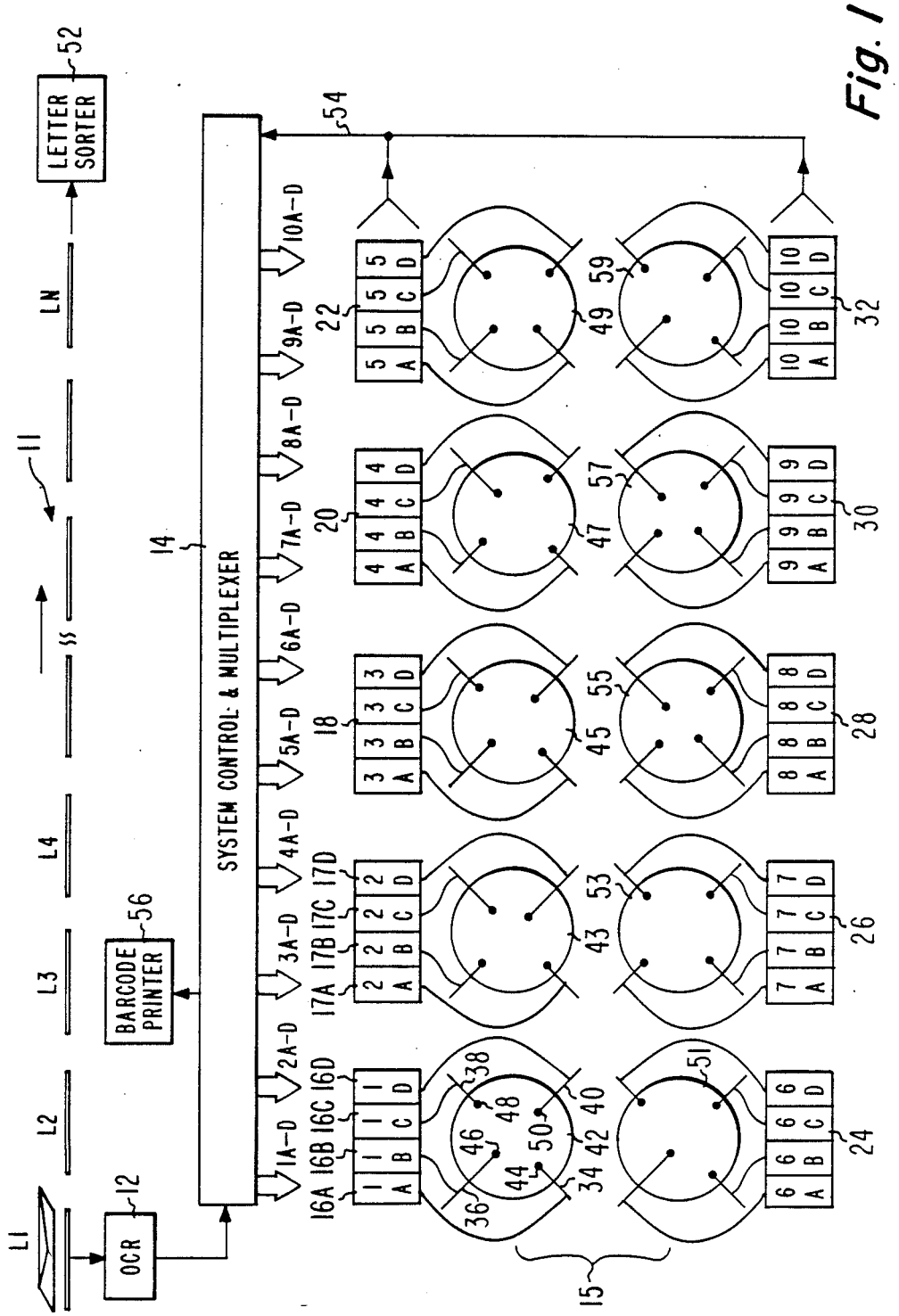
FIG. 1 is a diagramatic representation of a system in accordance with one embodiment of a present invention.

In FIG. 1, a conveyor 11 conveys a serial stream of letters L1-LN or other types of mail for reading by an optical character reader (OCR) 12. OCR 12 reads the name, street, city, state and five digit zip code appearing on the face of the letters L1-LN. The name, street, city, state and five digit zip code read by the OCR 12 is supplied to system controller and multiplexer 14. Multiplexer 14 has a plurality of parallel channel outputs 1A-D, 2A-D-10A-D. These outputs are applied via multiple lines to CD-ROM controllers for reading data from an array 15 of CD-ROM read systems.

For example, outputs 1A are applied to controller 16A, outputs 1B are applied to controller 16B, and so forth. Outputs 2A-D of multiplexer 14 are respectively applied to a second set of identical controllers 17A-17D wherein outputs 2A are applied to controller 17A, outputs 2B are applied to controller 17B and so on. The remaining outputs 3A-D-10A-D are applied respectively to the remaining sets of controllers 18, 20, 22, 24, 26, 28, 30 and 32 of the system. Each of the sets 18-32 comprise four identical controllers which are also identical to controller sets 16A-16D and 17A-17D for receiving inputs from the system control and multiplexer 14.

Controller 16A operates an actuator 34, controller 16B operates an actuator 36, controller 16C operates an actuator 38 and controller 16D operates an actuator 40. Actuators 34-40 are mechanical devices for radially displacing respective laser read heads 44-50 secured thereto. Actuators 34, 36, 38 and 40 are represented by radial lines relative to CD-ROM drive 42. Actuator 34 is radially aligned with actuator 38 on diametrical opposite sides of the drive 42. Similarly, actuators 36 and 40 are radially aligned normal to actuators 34 and 38. Actuator 34 is coupled to a read head 44, actuator 36 is coupled to read head 46, actuator 38 is coupled to read head 48 and actuator 40 is coupled to read head 50. Read heads 44-50 are identical and comprise a laser read mechanism as available in commercially available CD-ROM drive systems. Each controller 16A-16D independently drives and controls the position of its respective corresponding read head 44-50 via the respective actuators 34-40. The use of plural read heads with independent actuators and controllers allows overlapping of periods of time to adjust the radial position of the heads as part of a seek operation. This permits the plural heads to be read consecutively without having to allow intervening time periods to adjust read head radial positions.

In similar fashion, a CD-ROM read head and actuator system is associated with each controller 17A-17D and the remaining controller sets 18-32. The laser read drive subsystems are identical.

System control and multiplexer 14 responds to the scanof the address on a given letter L1-LN and activates a selected one of the controllers to access a portion of a disc known a priori to contain the standard address and five+four zip code corresponding to the read letter. A CR-ROM disc is on each of the CD-ROM drives. Each disc is part of a data base containing the standard address including the city, state and five+four zip code. As known, the five-digit zip code refers to a destination locality whereas the additional four digit zip code narrows the destination to a given street or carrier route. The United States Postal System desires to bar code print the nine-digit zip code (five+four) onto each letter so that the letter may be automatically sorted by the bar code imprinted address by a sorter 52. Sorter 52 may be of the first or second types as described above. To do this the controllers for each of the CD-ROM drive systems supply the additional four digit specific zip code in response to the reading of the normal five digit zip code appearing on each letter.

This requires the system to read the street address and five-digit zip code appearing on each letter. The system then extracts from a data base containing the standard street addresses and the nine-digit zip code for every such address range in the United States. System control and multiplexer 14 generates from the read address and five-digit zip code an appropriate signal which identifies a particular controller of a particular disc drive system corresponding to that read data. That signal causes the read head of a given system to access the standard address and nine-digit zip code information from a given CD-ROM disc driven by that drive system. To perform this access the read head radial position is slewed to the approximate track location using a digital position encoder. The read head is then positioned to the desired track portion by counting tracks. Because conventional CD-ROMs have access times of about 1 to 2 seconds and because the postal system requires accessing of the data base at a rate of 12 items per second, normal CD-ROMs are too slow for this purpose.

By providing 10 drive systems 42, 43, 45, 47, 49, 51, 53, 57, and 59 each receiving a CD-ROM disc containing a different portion of the standard address and nine-digit zip code data base and by providing each drive system with four read heads it is possible to access the selected addresses and zip codes at an average rate of 12 units/second. The number of read heads and thus access channels is a function of the required access time in relation to the required read rate. Access time is the time required to radially position the head plus the time to rotate the disc about one revolution under the head. Four channels corresponding to the four read heads permit $4 \times 80 = 320$ ms access time for each channel and still maintain the required average read rate of 12 units per second. The access time for a disc is a function of the disc rotation speed and head seek time. For example, the time available to radially position the head may be $3 \times 80 = 240$ ms; and the time to rotate the disc one revolution may be 80 ms. CD-ROMs normally have about 18,000 spirally connected tracks.

In a commercially available player, the head is moved radially to the approximate track location and the data is read to determine the actual location of the desired data. The read head is then radially displaced a smaller incremental distance and the data read again until the target data is located. This process, thus, is time consuming. By providing the four channels per disc, a 320 ms access time can be allowed. Such performance is reasonable for the actuator and controllers as will be described below in more detail. If better performance is achieved by a specific actuator design, the number of channels can be reduced, still conforming to the principles of the embodiment described herein. Ten discs are illustrated in FIG. 1 since it is believed that the nine-digit zip code defines a range of addresses which consists of about 29 million records requiring 3 gigabytes of data storage. Since a conventional CD-ROM disc contains about 0.5 gigabytes of data, it is believed that 10 discs are adequate to contain the 29 million records. Well understood techniques of data compression can be used to reduce the number of discs required.

In response to the read address from OCR 12 the system control and multiplexer 14 determines which one of the systems 42-59 and which one of the controllers 16A-16D through 32 contains the desired address and generates an appropriate signal. That signal selects the specific read head and given drive system for accessing the data at that selected drive system. How the controllers operate and select the information and how the system controller derives the signal for selecting a given controller is described below in more detail in connection with FIG. 3.

Once a signal is applied to a given controller and that controller read head accesses the data on its corresponding CD-ROM disc, the information is applied via line 54 to system control and multiplexer 14. The information accessed on a given CD-ROM disc is the standard street address range and corresponding nine-digit zip code. Once the information applied to the multiplexer 14, multiplexer 14 causes bar code printer 56, which may be a jet ink printer, to print the bar code representing the nine digit zip code on the individual letters such as letter L3.

In FIG. 2 representative system 42 includes a disc drive 58 and a CD-ROM disc 60. One controller 16A and its corresponding actuator 36 are shown in solid, the remaining controllers and actuators are represented by the broken radial lines 62, 64 and 66.

Disc 60 contains data which are recorded in a continuous inside out spiral track. As is known, CD-ROM discs contain data in a series of user data blocks of fixed size alternating with headers containing serial numbers and error detection codes. User data files may contain any number of data blocks. There are no sectors of fixed angular extent or discrete concentric tracks as is the common practice in magnetic disk recording. As a result, the length of a file depends on the amount of data in that file and the angular location of the beginning of that file may vary from track to track along the spiral. The header information as employed on the disc of the present data base is conventional.

The method of providing rapid access to data will now be described. The access time in a disc recording system has two components, conventionally named seek time and latency time. Seek time is that required for the read head to find a specific track, commonly by a generally radial movement (which may be in a straight line or arc). Latency time is that required for the disc to rotate to bring the desired data past the read head. In a CD-ROM, the latency time is determined by the rotation speed of the disc which in turn is a function of the data density of the track and the data bandwidth of the processing circuits. For conventional CD ROMS, latency time may be over 200 ms. Seek time must be reduced to tens of milliseconds to achieve the performance goal of 320 ms access time. A CD-ROM player utilizes a pre-recorded plastic whose tracks are spaced about 1.6 micrometers apart. Because of thermal expansion and manufacturing variations, the exact radial position of a track is initially unknown to the system. In conventional CD-ROM players, specific tracks must be located by a method of successive approximation as described above. The present system provides a means for accessing the disc by each head in 320 milliseconds in one seek.

Each disc of the data base, for example disc 60, is marked with reference indicia 68 and 70. Indicium 68 represents an angular reference mark by which the angular position of data from that reference mark is measured by the value of angle $\theta$. Indicia 70 divide the disc into small angular increments to provide precise angular location of any point on the disc with reference to the indicia 68. Two sensors 72 and 74 are coupled to controller 16A for supplying information relative to the angular position of the reference indicium 68 and for providing information via indicia 70 of the exact angular position of any point on the disc 60. Each controller 16A through 16D through controllers 32 (FIG. 1) include sensors such as sensors 72 and 74 for sensing the reference indicia on the corresponding rotating disc.

Drive 58 rotates disc 60 at a constant angular speed. However, the data on the disc is recorded in its spiral format at a constant linear rate. Therefore, in reading the data along the spiral track as the distance r from the center of a disc changes in value, the frequency of the read data will also change. Since the data on the disc are binary in an encoded format, the interpretation of the signals frm the optical read head will be performed by digital logic circuits and microprocessors which conventionally operate in a synchronously organized fashion driven by a central clock oscillator. In a conventional CD-ROM player, the disc speed is adjusted as a function of playback head radius to give a constant playback data rate. Because the disc 60 is driven at a constant angular rate, it would be impossible to read the data from the four read heads 44-50, which may be positioned at different radii, at a given constant data rate unless otherwise provided for. Means is provided as will be described below for reading the data from each of the tracks regardless the track radial distance r from the center of the disc at a constant data rate. In FIG. 3, the radial line r is a measure of the distance from the axis 76 about which disc 60 rotates. The disc drive 58 of system 42 includes a turntable 78 which receives the disc 60 and further includes a drive motor 80 for rotating the table 78 at a constant angular rate.

Each of the discs 60 as is known comprises static data impressed upon an optically reflective surface and coated with a transparent protective coating. The data comprise impressions formed in the reflective coating surface so that the transitions at the beginning and end of each depression form a binary signal representing the data. The binary one, for example may represent the transition from the bottom of the depression to the disc surface or vice versa whereas a binary zero may represent the bottom of the depression or the disc surface between depressions. These depressions are formed in a spiral track. The disc may be premastered and pressed in a conventional manner and then distributed to a wide number of local postal sorting stations located throughout the United States.

The data base comprises a set of ten discs. Each disc is associated with a separate drive system 42. Encoded at the end of the data track of each disc is an indexing table. The indexing table comprises a hash index number and the r-$\theta$ coordinates of the file headers expressed in radial and angular dimensions. The table of coordinates is recorded last on the disc so that its presence does not disturb the locations of the files whose coordinates are calculated from the location of those files. The recording of a CD-ROM master is a precision process so that angular and radial location of any data block can be calculated in advance. A computer program prepares the database and the data block headers. From this data it is then possible to calculate an index map of the disc which is appended to the end of the files for each disc master tapes, so that the presence of the index does itself not disturb the order or location of the data files just organized. That information is then assigned unique numbers associated with the files. One example for deriving such unique numbers is a hashing technique.

In the hashing technique a number is extracted from the address including the street, city, state and five-digit zip code. The hash algorithm generates the index number. For example, the five digit zip code is concatenated with the address number and the initial letters of a street name. These represent a large digital number which is divided by 180,000 (the number of tracks on the ten discs). The remainder of such division comprises an index position on the spiral track relating to the header block serial number identifying a given file.

Such an algorithm, however, does not control the number of addresses which may share a given index number. This could create an overflow situation where the data is recorded in concentric rings as on a conventional magnetic disc file. Since the CD-ROM data is continuously recorded in a spiral, the file lengths in practice need not be uniform and there is no data overflow as the files are recorded contiguously, beginning-to-end. Thus, in the context of the present invention for each hash index number created, two coordinates are assigned to a location on a disc, the radius r and the header block angular location $\theta$. The table at the end of the spiral track on each disc comprises the hash index number and its corresponding radius r and $\theta$ values.

The system control and multiplexer 14 includes computer memory 82. The memory 82 stores the hash index table that is read from a given disc 60 when the disc 60 is loaded onto the drive system 42. One of the four read heads, e.g., head 46, reads that table and transfers the information to the memory 82 of multiplexer 14 upon command by multiplexer 14.

Multiplexer 14 includes a buffer memory 84 for storing the name, street, city, state and five digit zip code read by OCR 12. This information is supplied to computer 86 which derives the hashing index number, as discussed above. Since in computer machine language all alpha characters are represented in ASCII character numbers, the letters and digits of the address form a serial set of digits which form can be interpreted as a number from which the hashing algorithm of the computer 86 derives the hash index as previously explained. The name and address are supplied from the memory 84 to a comparator 88 for reasons to be explained later. A processor in multiplexer 14 (not shown) in response to the index number derived from the name and address read by OCR 12 from a letter L1-LN in the letter stream searches for the corresponding hashed index number in the table of memory 82. That index number corresponds to a given drive system 42-59 (FIG. 1) and r-$\theta$ coordinates which locate the beginning of the file containing that name, address and nine-digit zip code in the disc on that drive system.

Have identified the drive system and r-$\theta$ coordinates of the file of interest, the information is sent via electronic signals on lines 90 to controller 16A. It is assumed, for example, that the signal on line 90' is one which activates drive system 42 based on the correspondence of the hash index number to drive 42 in the memory 82. Of course, it should be understood that the lines 90 represent the lines to a single controller and that similar lines are fed to each of the other controllers corresponding to each read head in the system. Multiplexer 14 via a signal such as on line 90' selects that controller which is to receive the control signals and coordinates for driving the selected read head.

The signals on lines 90 are applied to actuator control 92 of system 42. Actuator control 92 may be a microprocessor for performing various functions to be described. One set of inputs to control 92 is the sense signals from sensor 72 and 74 for indicating the angular position of the reference angle $\theta$. One output of control 92 drives actuator 36. Actuator 36 is a commercially available read head drive for moving the read head 46 back and forth in the radial direction relative to disc 60. Read head 46 is commercially available and includes a laser 96 for reading the encoded data on disc 60. The laser 96 is on a support 98 which is moved in the radial directions by actuator 36. Coupled to support 98 is a linear position encoder 100.

Linear position encoder 100 provides a digitally encoded signal representing the positon of the laser 96 along the radius r. The position of the laser 96 is also measured by monitoring the track sense line from the disc read electronics 102. This line transmits a plus or minus signal depending on whether the read head is inside or outside a specific track. When searching across the tracks, this signal varies cyclically as it passes over the tracks. By counting the cycles, the numbers of tracks passed can be determined by an algorithm in actuator control 92. The linear position encoder 100 serves to provide information to enable the actuator 36 to slew the read head 46 to within several tracks ahead of the track containing the file of interest. The track count provides additional information to enable the actuator to position the read head 46 at the track of interest. This permits the rapid accessing of the data base in a single seek within the 320 millisecond requirement described above. Linear position encoder 100 provides a signal to actuator control 92 giving the encoded position information of the radial location of the read head 46. The actuator control 92 uses this information from encoder 100 to process the signals from the multiplexer 14 to precisely position the laser 96 where desired in accordance with the given hash index number derived from a given letter.

Associated with the read head 46 are the disc read electronics 102 which read the information including sensing the tracks and other housekeeping track and data reading information. The control 92 generates a clock signal on line 104 for providing the appropriate data read rate for electronics 102. The clock rate on line 104 differs in accordance with the radial distance r sensed by the read head 46 and as interpreted by the electronics 102. Included within control 92 is memory 106.

Memory 106 contains a calibration table which includes the track radial distance r as derived from the memory 82 in multiplexer 14, and which includes the actual distancer' as measured by position encoder 100 to the actual track represented by the corresponding hash index number. For each such assumed radius r and actual measured radius r', a clock signal having a frequency f is assigned the r and r' values. The clock frequency changes as the radial distance r of a given track changes relative to the axis 76 and is computed by the system for each actual r' measured. The table in memory 106 is created as the system is started up. The information on the tracks may include self-clocking codes for sychronizing the data read electronics. The actuator control 92 includes a microprocessor (not shown) which periodically causes a read head to scan the tracks of its disc 60 to update track r' information into memory 106 updating the table. This update information may be multiplexed with the normal deployment of the read heads during data seek cycles.

The reason for updating the track location with the value r' periodically and for providing the calibration table in memory 106 is to compensate for manufacturing and environmentally caused track location errors. Temperature variations, manufacturing processes, and tolerances in pressing each disc are such that actual locations of the tracks on each disc may change from any predetermined value. Normally there will be local and global errors in the molding process, shrinkage after molding, and thermal expansion and aging effects in use which need to be compensated. The disc is thermoplastic material in which these track spacings are approximately 16 microns, which dimension can easily change due to the environmental conditions. Therefore, the radius r of any specific track, that is a turn of the spiral, cannot be precisely known in advance except by a periodic update calibration process.

The focus servo in a conventional CD-ROM system embodied in the actuator control 92 operates independently of the data tracking. A drive signal on lead 90' is applied to actuator controller 92 selecting system 42. The signals applied to actuator control 92 represent the r and $\theta$ coordinates for the hash index number derived from the street address on the letter L1 then being read by OCR 12. These coordinates, particularly the r coordinate, is used by the calibration computer 106 to derive the r' coordinate and determine the data clock frequency f for that r'. The actuator control 92 in response to the r' signal from the calibration computer then causes the encoder 100 to slew the laser 96 of the read head 46 into position.

The read electronics 102 counts tracks supplying the track count to control 92. Control 92 in response to the track count moves laser 96 to the position represented by the distance r'. At this point the disc read electronics counts tracks to position the read head 46 at the target track. The address information in that file located on the targeted track is then read at the f data rate. Address information is supplied by the disc read electronics 102 to terminal T, which applies that signal to comparator 88.

Comparator 88 includes a buffer for storing the street, city, state and zip code information that is read from the letter L1 and which corresponds to the file being read from disc 60. The city, state and the five-digit zip are compared with the city, state, five digit zip read from the file from disc 60. When there is a match, the comparator produces a signal and applies it to the bar code printer 56 for printing a bar code on letter L1, which in the meantime during operation of the system has moved along conveyor 11 into position over printer 56. The bar code represents the nine-digit zip stored on the disc 60 then being read. Bar code printer 56 is a ink jet printer which prints the bar code at the 12 letter per second rate. Data sorter 52 then reads the printer bar codes and sorts the letters by the nine-digit code. In the example given with respect to FIGS. 1–3, a zip+4 digit code was employed. However, the system is equally applicable to a zip+6 digit zip code which is a complete destination address for every entity in the United States.

In the description of FIGS. 2 and 3 system 42 was given by way of example in conjunction with the operation of controller 16A. The operation of every other controller in the system associated with each of the ten disc drives is represented by the description given above. Further, the system control and multiplexer 14 can rapidly provide a read signal to each of the controllers 16A through 16D of a given disc drive operating those read heads. It should be understood that the letters are read sequentially and, therefore, there is a time lag between the operation of each of the read heads. Each head operation has a 320 millisecond duration, as described above. However, with the 320 millisecond delay for reading a particular track by a given head, the use of four heads per disc permits the four heads to operate in that 320 millisecond time frame and therefore, read that disc in 80 milliseconds. Any of the read heads at any of the disc drive systems may be read in any given time frame in accordance with the data read from letters $L1-L_N$. Not shown is a synchronization system for synchronizing printing onto letter L3 by printer 56.

While two sets of inidicia 68 and 70 are indicated on disc 60, one indicium 68 for providing a angular reference for angle $\theta$ and the second set of indicia 70 for providing precise angular positioning information about the disc 60 relative to indicium 68 may be provided other means. For example, a single indicia mark such as indicium 68 may be provided without the indicia 70. The speed control system in a conventional CD-ROM player includes sufficient accurate speed control so that suitable timing can be derived from the speed setting system for providing precise angular locating information of data on the disc relative to indicia 68. Because the files may be of unknown length and differ from one another it does not matter where the file headers are positioned relative to the reference indicium 68. In this way the relatively slow operation of the actuator 36 is compensated for by the multiple actuators and read head systems associated with each disc drive system.

In the meantime, when a particular drive head is not in use or during a maintenance period of sufficient length, control 92 automatically updates the calibration table in memory 106. This is done by recomputing the values of r' for each of the tracks on the disc. This recomputed r' value is inserted in memory 106 and the prior value erased. The values of the frequency f for the clock rate for reading the data are calculated by the calibration computer to providing accurate clock data for each value of r'. This calculation may be done, for example, using a lookup table stored in memory to specify a given clock rate for a range of values for 4' for all possible ranges on a given disc.

The term track as employed in the claims is intended to include a continuous spiral format or a plurality of concentric rings.

Figure 4:
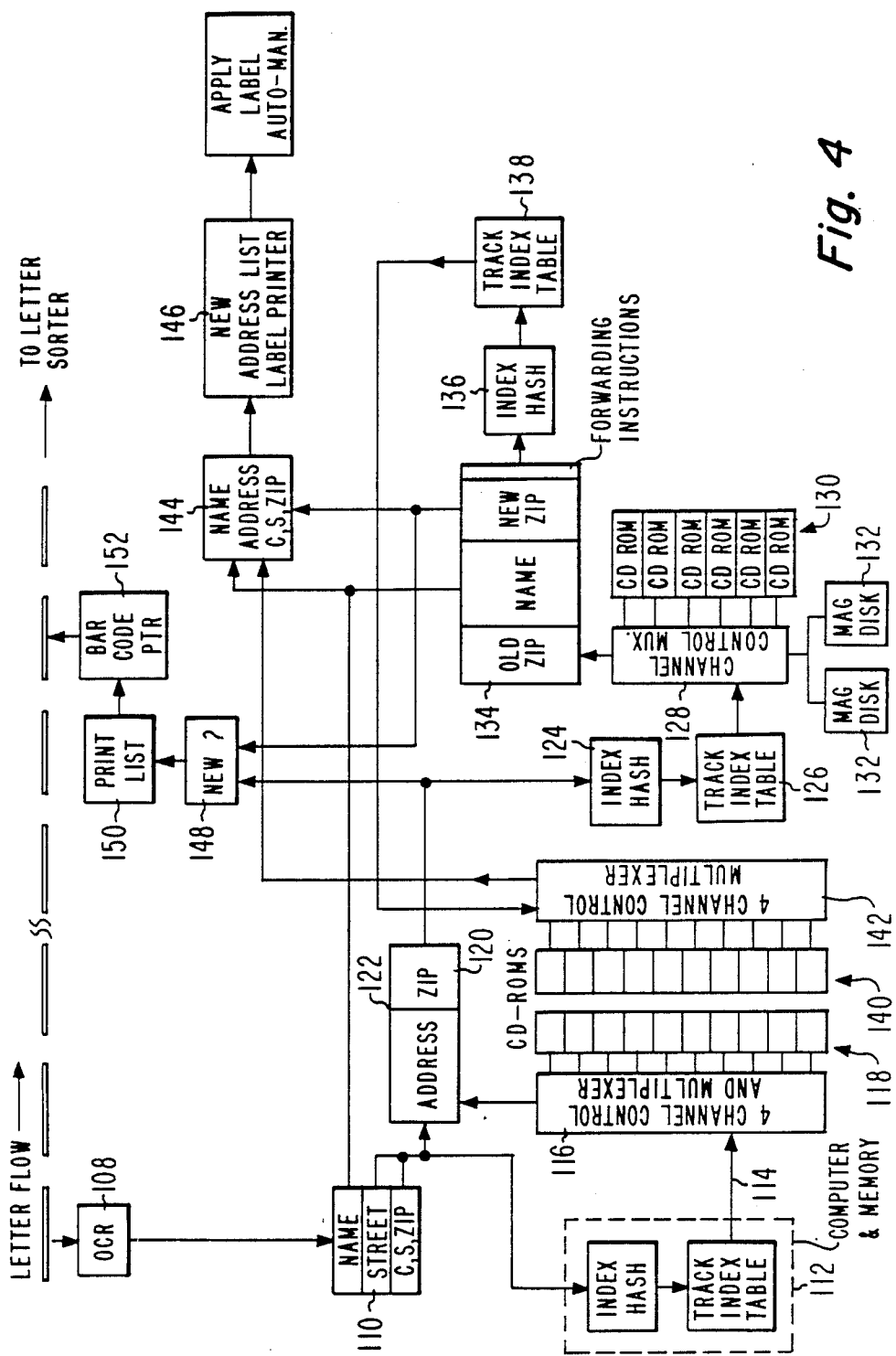
FIG. 4 is a block diagram of a system for updating the data in a system having a significant number of changes of data.

One practical problem present in a normal postal system is the approximately 40 million changes of address annually, which average about 110,000 changes per day as discussed in the introductory portion. FIG. 4 illustrates a system which can provide an on-line updated data base including the current changes of address. This system assumes that simple data compression techniques can be used to compress an eleven-digit zip code file to 5 gigabytes. This database is contained on ten discs each of which is accessed by the four heads described above in connection with FIGS. 1–3. Two sets 118 and 140 of such ten discs are employed in the system of FIG. 4.

Data from the OCR 108 is stored in memory 110 and includes the name, state, city, state and five digit zip code. The information is supplied to computer in memory 112 for extracting a hash index from the city, state and zip code in a manner similar to that described above in connection with FIG. 3. The derived index is applied to a track index table stored in memory and derived from the CD-ROMs to initialize the system as also described above. The track index table in computer memory 112 provides the disc drive number and the r and θ coordinates on the particular disc. This information is applied on line 114 to a four-channel control multiplexer 116. Multiplexer 116 includes the functions of disc drive selection channel allocation and control of head actuators in a manner similar to that described with respect to the system control and multiplexer 14 of FIG. 3. CD-ROM player systems array 118 may have 10 players with four heads each. Each disc contains a portion of a data base comprising a five-digit zip+6 standard address file for all mail destinations in the United States. This data base comprises approximately 6 gigabytes of data which may be compressed.

The information read from the array 118 is applied to comparator buffer 120. The comparator buffer contains the standard address and eleven-digit zip codes from the disc then being read by OCR 108. This information is used to locate the actual zip+6 code that is desired. In the buffer 120 the desired zip+6 code is placed in memory 122 of the buffer. That zip+6 code is the information that is read from the CD-ROM disc of one of the selected player systems 118. The zip+6 code is applied to a hash indexing computer 124 which derives a index hash number from that zip code. This provides an index to table 126 in memory of names of people who have moved and changed addresses.

Controller 128 receives the index information from table 126 and in a fashion similar to the operation of multiplexer 14 of FIG. 3 selects that particular CD-ROM player system from system array 130 which may be six player systems for seeking the name and zip+6 code from a CD-ROM disc containing a change of address file. The array 130 of discs contain current change of address files which is periodically updated. These discs contain only the names and zip+6 codes of those individuals or entities who have changed address. Each player of system array 130 is operated by four heads as described above. The information on each of the discs of system 130 include the old zip+6 code, the name of a person who has moved, and the new zip+6 code as the record format. In addition, there can be a field in each data file associated with that name and zip code indicating the postal patron's particular forwarding instructions.

These discs are prepared from change of address notices from postal patrons received at the different postal locations throughout the country. A set of magnetic disc drives 132, for example, Winchester disc drives, contain the daily updates of change of addresses. Such daily change of address updates are provided to each local sorting station on a magnetic casette type cartridge. The cartridge is fed into a system which reads the information from the casette onto the magnetic discs of drives 132.

The postal service compiles on a daily basis the change of address notices nationwide and reads them onto the magnetic tape casette which are duplicated and mailed each day to the mail sorting centers. These tapes add to the track index table and to the contents of the magnetic discs so that these become extensions of a CD-ROM file on the array 130 of discs.

When the magnetic discs are nearly full, a new set of CD-ROMs are issued which bring all changes up to date. Upon receipt of the new CD-ROMs, most of the data on the magnetic discs are purged. It is believed that not all of the data will be purged, as there will be a finite delay of several days between issuing the magnetic discs and the receipt of such updated discs. In this manner the file structure on the magnetic discs maintains the same simplicity as that on the CD-ROMs, so that the data may be accessed in a single seek. The magnetic disc drives and accessing heads are conventional and normally have relatively high access rates.

The information from the CD-ROMs in the change of address file of array 130 is selectively supplied via the multiplexer 128 to the comparator buffer 134. The comparator buffer 134 contains the old zip code, the name of the individual and the new zip code. This provides a correspondence of the old zip code, the name of the individual who has moved, with the new zip code. The buffer 134 may also include memory storage including the forwarding instructions, if any, that an individual has requested and is recorded on the particular CD-ROMs of the system 130.

If there is a change of address for a given name, the hash/index procedure described above is used via hash computer 136 and track index table 138 to derive an index to a second standard of addresses stored on array 140 of CD-ROM discs and corresponding discs players. The array of discs 140 are operated under the control of multiplexer 142 which is similar in operation and function to multiplexer 116. Buffer 144 accumulates the new address and zip codes for change of address letters. The name and address are received from multiplexer 142 and the new eleven-digit zip code is received from buffer 134. This information is delivered to an external printer 146 which prepares printed labels. Those labels are the type which will be attached to the letters and have the name, address and new zip+6 codes on them so they can be read by a mail delivery carrier. These letters are to be directed to a specific output channel in the letter sorter from which they will be taken to a printing station where the address labels can be attached. The order of the letters on the conveyer after being read by OCR 108 is preserved in this process. The labels may be applied by automatic or manual means.

A new zip code is supplied to comparator 148 which compares the new zip code to the zip code in buffer 122, which letter code is the standard zip code found in the CD-ROM systems array 118. If the new zip code differs from the old zip code in buffer 122, a signal is sent to a print list controller 150, which operates a bar code printer 152 to print a bar code representing the new zip code. If the new zip code does not differ from the old zip code, indicating no change of address having been found, then the print list controller 150 causes the bar code printer 152 to print the bar code representing the old zip code from buffer 122. The bar code is imprinted on the letters in the letter stream which are then later automatically sorted in the process. The sorted letters are then stored in sequence as printed by printer 152 for receiving the labels for those which have a new address. The new address label is then applied as set forth above. Thus the bar code from printer 152 indicates on the information encoded in the bar code that a particular letter is in need of a change of address label or that its address is unchanged. Because the magnetic discs 132 are updated daily, change of addresses for all destinations are included in the zip+6 code on a current, practical basis. The CD-ROM discs are easily manufactured and distributed, as needed, to the different letter sorting locations throughout the nation.

What is claimed is:

1. Apparatus for rapidly accessing data elements on a serially encoded optically readable disc, said elements comprising a plurality of radially spaced tracks of a given number and spacing along a reference radial line, said tracks surrounding the disc center and partitioned into a plurality of contiguous files, each file having a certain angular and radial position on the disc relative to a reference position, said file angular and radial position tending to periodically differ from disc to disc and within a disc at different times in an unknown way in response to thermal contraction and expansion due to changes in the ambient temperatures and due to manufacturing tolerances, the data elements on the different tracks tending to have different read data rates when said disc is rotated at a constant angular velocity, said apparatus comprising:

disc drive means for receiving and rotatably driving a disc at a constant angular velocity;

a plurality of optical disc read means associated with said disc drive means for reading said data elements from the disc then being driven by that drive means at respective ones of angular spaced locations at a constant data rate, each said read means including a respective actuator means responsive to an applied control signal representing a given file position for independently reading the data elements from the file corresponding to that given file position; and control means for generating said control signal and for selectively applying said control signal to currently selected one of said read means, said control means including means for correlating each said radially spaced track to each said certain file position to provide in memory said certain file position and means for periodically updating in said memory the correlation of said tracks to said certain file position to provide a periodically corrected certain file position.

2. The apparatus of claim 1 wherein said track spirals and said disc drive means includes means for rotating the disc at a constant angular velocity such that the reading of data from said files changes in frequency in proportion with the radial position of the read file on the track, said read means including means for corresponding the frequency response characteristics of the read file to the radial position of the read data so as to read the data from anywhere on the spiral track at substantially constant frequency.

3. The apparatus of claim 1 including a plurality of said drive means, each for receiving and driving a separate, different disc, each drive means including said plurality of read means, said control means including means for causing said signal to select one of said drive means and one of said read means of that selected drive means.

4. The apparatus of claim 1 wherein said means for generating a signal includes data read means for reading a data element from each of a plurality of objects and means for deriving a code from each said read data elements, said code having a unique value corresponding to each different data element, said means for deriving including means for correlating said derived unique code for each read data element to a corresponding file position wherein said signal manifests the file position of a read data element.

5. The apparatus of claim 1 wherein each said read means includes a laser read head for reading encoded information on said received, rotating disc.

6. The apparatus of claim 5 wherein said displacement means includes digital position encoding means for generating a position signal representing an approximate position of said read head relative to said spiral disc track and means for applying said position signal to said actuator control for moving the read head adjacent to said file position.

7. Apparatus for rapidly accessing data from a compact disc read only memory (CD-ROM) containing a digitally encoded data storage track impressed upon a light reflective surface, said track containing a plurality of contiguous data files, the location of said files on said track tending to change in response to temperature excursions causing said disc to expand and contract, said apparatus comprising:

disc drive means for receiving and rotating said disc about an axis;

a plurality of laser disc read means located at angular spaced positions about said axis, each read means including means for reading said data from anywhere on said spiral track, each read means including means for reading data from said disc independent of the reading of data by remaining read means, each read means including a read head and read head positioning means, said read head positioning means including means responsive to a read head positioning signal applied as an input thereto for aligning the head relative to a given file track; and control means responsive to an applied input signal for generating said read head positioning signal and for applying said positioning signal to said read means, said control means including memory means for storing the position of said given file track and means for periodically determining the current position of said given file track and for periodically updating said stored position of said given file track in said memory means with said determined current position.

8. The apparatus of claim 7 wherein said control means includes means for reading data items from an object, means for deriving a file location code corresponding to each different data item from the read data items, and means responsive to said derived file location code for generating said read head positioning signal.

9. The apparatus of claim 8 wherein said data items include street name, city, state and five-digit zip code of a mailing address, said means for deriving including means for deriving from said mailing address a unique number corresponding to that mailing address, said means for generating said read head positioning signal including means for storing in memory the approximate file location on said disc of the file containing that mailing address for each said unique number.

10. A zip code enhancement system for adding an x digit zip code to a five digit zip code on an object containing a mailing address comprising a street, city, state and five digit zip code address, x being a positive integer, said system comprising:

a plurality of CD-ROM disc drive means, each for receiving and rotating a CD-ROM disc having a spirally encoded track containing a plurality of contiguous files, each file comprising a data block containing synchronization data, file address data, zip code address plus x for a plurality of zip code addresses, and error detection and error correction data;

means for reading the five digit zip code address on said object and for deriving a unique number for each different read address;

means for correlating each said derived number to a given disc containing that read zip code and to a given angular position on that given disc from a reference angular position and to a given radial distance from the center of that given disc to the file containing that zip code address and for generating an output signal representing said correlated angular position, radial distance and given disc in response to the reading of said address on said object; and a plurality of disc read means responsive to said output signal applied thereto for reading that file located at that angular position and radial distance on that given disc.

11. The apparatus of claim 10 wherein said system further comprises zip plus x digit print means responsive to the reading of a disc by said disc read means for printing information representing the five-plus-x-digit zip code on the corresponding object containing the five-digit zip code.

12. The apparatus of claim 10 further including angular reference indicia on each second discs, said disc read means including means responsive to said indicia for generating a signal representing said reference angular position and for determining said given angular position from said reference position.

13. The apparatus of claim 10 wherein each said disc read means includes a read head and read position means, said read position means including means for moving said head to an approximate location relative to said given radial distance and track counting means coupled to said head for counting tracks from said approximate location in a given direction to place the head at that track containing the desired file.

14. The apparatus of claim 10 wherein said drive means includes means for rotating a received disc at a constant angular velocity causing the frequency of the read data along said track to differ as a function of the radial position of the read track to the center of the drive means, said read means including frequency compensation means for reading data at substantially the same data rate regardless the position of the data on the track.

15. A CD-ROM disc read system for reading data recorded at a constant linear rate on a disc track comprising:

CD-ROM disc drive means for driving a received disc at a constant angular velocity resulting in different playback rates for different radius portions of the track;

a plurality of read head means for independently accessing and reading data at a plurality of disc locations from anywhere on a given disc at substantially the same constant data rate regardless the difference in actual rates occurring on the different track portions being read; and control means for selecting and operating the selected read head means, said control means including means for generating a signal representing the radial and angular positions of said track portions relative to a reference position at a plurality of locations on a disc, each read head means including a read head and means responsive to said signal applied as an input thereto for positioning the read heat at that radial position relative to the received disc for reading target data from a given track portion, said means responsive to said signal including means for updating in memory said radial and angular positions of said target data track portion and means for reading said updated radial and angular positions from said memory for positioning each said read head.

16. A system for updating change of address information on a letter comprising:

means for reading the name and address on the letter;

means including first CD-ROMS for deriving and generating a standard eleven-digit-zip code from said read name and address;

means including second CD-ROMs for determining if a given read name and address has a corresponding change of address and for storing in memory the new eleven-digit zip code for such change of address;

means for printing the sotred new zip code, if any, on said read letter; or, if not new, the old zip code, and means for printing an address label containing the new, changed complete address, if any, for said letter in response to said determining.

17. The system of claim 16 wherein said first CD-ROMS includes a first set of CD-ROM systems for providing a standard eleven-digit zip code for a given name and address and a second set of CD-ROM systems including means cooperating with said means for reading for supplying said complete name and address to said means for printing.

18. The system of claim 16 wherein said means for printing includes means for printing a bar code on said letter representing the standard generated eleven-digit zip code or the new eleven-digit zip code of a changed address.

* * * * *